US00RE50006E

(19) United States
(12) Reissued Patent
Sergi et al.

(10) Patent Number: US RE50,006 E
(45) Date of Reissued Patent: Jun. 11, 2024

(54) CORROSION PROTECTION USING A SACRIFICIAL ANODE

(71) Applicant: Vector Corrosion Technologies Ltd., Winnipeg (CA)

(72) Inventors: George Sergi, Walsall (GB); Attanayake Mudiyanselage Gamini Seneviratne, Solihull (GB); David Whitmore, Winnipeg (CA)

(73) Assignee: Vector Corrosion Technologies Ltd., Winnipeg (CA)

(21) Appl. No.: 16/999,744

(22) Filed: Aug. 21, 2020

Related U.S. Patent Documents

Reissue of:
(64) Patent No.: 10,053,782
Issued: Aug. 21, 2018
Appl. No.: 14/601,537
Filed: Jan. 21, 2015

U.S. Applications:
(63) Continuation-in-part of application No. 13/553,498, filed on Jul. 19, 2012, now Pat. No. 8,961,746.

(51) Int. Cl.
*C23F 13/02* (2006.01)
*C23F 13/04* (2006.01)
(Continued)

(52) U.S. Cl.
CPC ..... *C23F 13/08* (2013.01); *C23F 13/04* (2013.01); *C23F 13/06* (2013.01); *C23F 13/10* (2013.01);
(Continued)

(58) Field of Classification Search
CPC ..... C23F 13/04; C23F 13/10; C23F 13/20; C23F 13/08; C23F 13/06; C23F 2201/02;
(Continued)

(56) References Cited

U.S. PATENT DOCUMENTS 3,650,837 A 3/1972 Palmer
3,978,309 A 8/1976 Strobach et al.
(Continued)

FOREIGN PATENT DOCUMENTS

AU 2013333673 4/2014
CA 2030970 5/1992
(Continued)

OTHER PUBLICATIONS

Cathodic Proteciton of Steel in Concrete, Annual Congress of the BSI, Feb. 1, 2012, pp. III-VI, 1., section C.4.5; p. 41.
(Continued)

*Primary Examiner* — Ling X Xu
(74) *Attorney, Agent, or Firm* — Adrian D. Battison; Ade & Company Inc.; Ryan W. Dupuis

(57) ABSTRACT

Corrosion protection of steel in concrete is provided by locating an anode assembly including both a sacrificial anode and an impressed current anode in contact with the concrete and providing an impressed current from a power supply to the anode. The impressed current anode forms a perforated sleeve surrounding a rod of the sacrificial anode material with an activated ionically-conductive filler material between. The system can be used without the power supply in sacrificial mode or when the power supply is connected, the impressed current anode can be powered to provide an impressed current system and/or to recharge the sacrificial anode from sacrificial anode corrosion products.

26 Claims, 12 Drawing Sheets

(Amended)

(51) Int. Cl.

| | |
|---|---|
| ***C23F 13/06*** | (2006.01) |
| ***C23F 13/08*** | (2006.01) |
| ***C23F 13/10*** | (2006.01) |
| ***C23F 13/20*** | (2006.01) |
| ***E04C 5/01*** | (2006.01) |
| *C04B 111/26* | (2006.01) |

(52) U.S. Cl.
CPC ..... *C23F 13/20* (2013.01); *E04C 5/015* (2013.01); *C04B 2111/265* (2013.01); *C23F 2201/02* (2013.01); *C23F 2213/22* (2013.01)

(58) Field of Classification Search
CPC . C23F 2213/22; E04C 5/015; C04B 2111/265
See application file for complete search history.

(56) References Cited

U.S. PATENT DOCUMENTS

| | | | | |
|---|---|---|---|---|
| 4,861,449 | A | 8/1989 | St. Onge | |
| 4,941,775 | A | 7/1990 | Benedict | |
| 5,026,468 | A | 6/1991 | Carpenter et al. | |
| 5,139,634 | A * | 8/1992 | Carpenter | C23F 13/04 204/196.03 |
| 6,022,469 | A | 2/2000 | Page | |
| 6,027,633 | A | 2/2000 | Whitmore | |
| 6,165,346 | A | 12/2000 | Whitmore | |
| 6,193,857 | B1 | 2/2001 | Davison | |
| 6,217,742 | B1 | 4/2001 | Bennett | |
| 6,303,017 | B1 | 10/2001 | Page et al. | |
| 6,315,876 | B1 | 11/2001 | Delahoyde et al. | |
| 6,346,188 | B1 | 2/2002 | Shuster | |
| 6,471,851 | B1 | 10/2002 | Bennett | |
| 6,572,760 | B2 | 6/2003 | Whitmore | |
| 6,793,800 | B2 | 9/2004 | Whitmore | |
| 7,160,433 | B2 | 1/2007 | Bennett | |
| 7,226,532 | B2 | 6/2007 | Whitmore | |
| 7,704,372 | B2 | 4/2010 | Glass et al. | |
| 7,749,362 | B2 | 7/2010 | Glass et al. | |
| 7,851,022 | B2 | 12/2010 | Schwarz | |
| 7,909,982 | B2 | 3/2011 | Glass et al. | |
| 7,914,661 | B2 | 3/2011 | Whitmore | |
| 7,959,786 | B2 | 6/2011 | Whitmore | |
| 7,998,321 | B1 | 8/2011 | Giorgini | |
| 8,002,964 | B2 | 8/2011 | Glass et al. | |
| 8,157,983 | B2 | 4/2012 | Bennett | |
| 8,211,289 | B2 | 7/2012 | Glass et al. | |
| 8,221,289 | B2 | 7/2012 | Glass et al. | |
| 8,273,239 | B2 * | 9/2012 | Glass | C23F 13/06 204/196.24 |
| 8,349,166 | B2 * | 1/2013 | Glass | C23F 13/02 205/734 |
| 8,961,746 | B2 * | 2/2015 | Sergi | C23F 13/20 204/196.04 |
| 10,053,782 | B2 | 8/2018 | Sergi et al. | |
| 2003/0137282 | A1 * | 7/2003 | Kainthla | H01M 10/28 320/161 |
| 2007/0194774 | A1 * | 8/2007 | Bennett | C23F 13/02 324/71.2 |
| 2008/0047843 | A1 | 2/2008 | Glass | |
| 2009/0032410 | A1 | 2/2009 | Glass et al. | |
| 2009/0189567 | A1 * | 7/2009 | Joshi | C04B 35/447 320/137 |
| 2009/0229993 | A1 * | 9/2009 | Glass | C23F 13/02 204/196.01 |
| 2009/0229994 | A1 | 9/2009 | Davison et al. | |
| 2009/0236764 | A1 | 9/2009 | Glass et al. | |
| 2010/0147703 | A1 * | 6/2010 | Glass | C23F 13/06 205/732 |
| 2010/0314262 | A1 * | 12/2010 | Glass | C23F 13/06 204/196.01 |
| 2011/0083973 | A1 | 4/2011 | Nelvig | |
| 2011/0040267 | A1 | 6/2011 | Trinh et al. | |
| 2011/0168571 | A1 | 7/2011 | Glass et al. | |
| 2011/0303530 | A1 | 12/2011 | Glass et al. | |
| 2012/0111736 | A1 | 5/2012 | Glass et al. | |
| 2012/0261270 | A1 | 10/2012 | Glass et al. | |
| 2013/0020191 | A1 * | 1/2013 | Glass | C23F 13/06 204/196.01 |
| 2013/0081955 | A1 * | 4/2013 | Al-Mubasher | C23F 13/16 204/196.36 |
| 2013/0247363 | A1 * | 9/2013 | Nelson | C01G 53/42 29/623.1 |
| 2013/0285597 | A1 * | 10/2013 | Goldstein | H02J 7/0052 320/107 |
| 2014/0021039 | A1 | 1/2014 | Sergi et al. | |
| 2014/0021062 | A1 | 1/2014 | Sergi et al. | |
| 2014/0021063 | A1 | 1/2014 | Sergi et al. | |
| 2015/0093660 | A1 * | 4/2015 | Barde | H01M 4/0416 429/406 |
| 2015/0284860 | A1 | 10/2015 | Glass et al. | |

FOREIGN PATENT DOCUMENTS

| | | | | |
|---|---|---|---|---|
| CA | 2030970 | | 6/1999 | |
| EP | 2909361 | | 10/2013 | |
| JP | 2002206182 | | 7/2002 | |
| JP | 2008533304 | | 5/2009 | |
| WO | WO9429496 | | 12/1994 | |
| WO | WO 9429496 | A1 * | 12/1994 | C23F 13/02 |
| WO | WO2005106076 | | 11/2005 | |
| WO | WO200609770 | * | 9/2006 | C23F 13/10 |
| WO | WO2008118589 | | 10/2008 | |
| WO | WO2011163005 | | 12/2011 | |
| WO | WO2013155691 | | 10/2013 | |
| WO | WO2013156691 | | 10/2013 | |
| WO | WO2014012185 | | 1/2014 | |

OTHER PUBLICATIONS

BSI Standards Publication; Cathodic protection of steel in concrete (ISO 12696:2012).

Jabeera et al (Journal of New Materials for Electrochemical Systems, 8, 291-297. 2005).*

Cakmak et al., Plant and Soil, 180, pp. 165-172, 1996.

Clem et al., Clays and Clay Minerals, 1961, vol. 10, No. 1, pp. 272-283.

BSI Standards Publication; Cathodic protection of steel in concrete (OSP 12696:2012).

Galvanic Point Anodes for Extending the Service Life of Patched Areas upon Reinforced Concrete Bridge Members; M. Dugarte and A. A. Sagues; Department of Civil and Environmental Engineering, University of South Florida, Tampa, FL 33620.

* cited by examiner

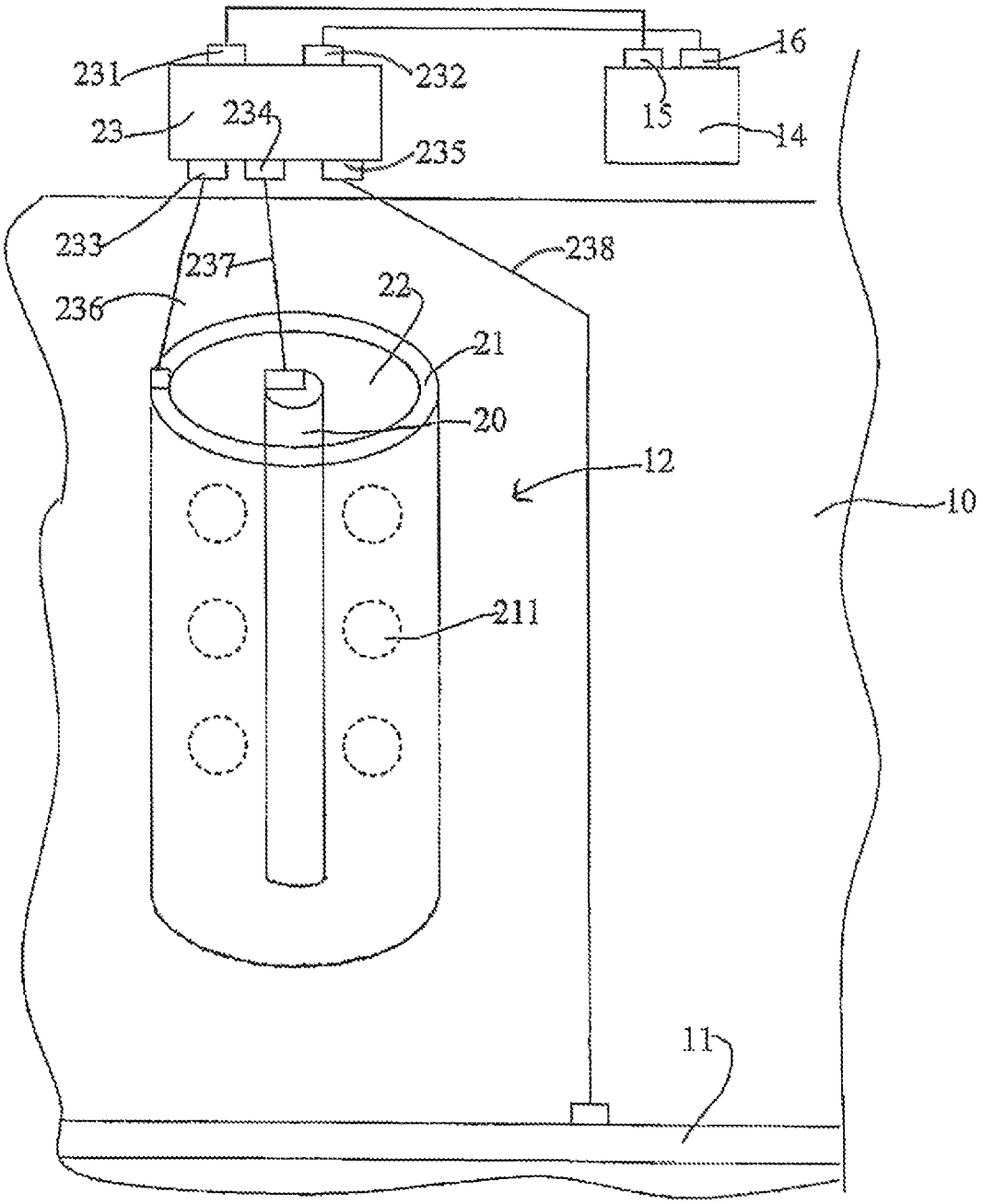
FIG.1
(Amended)

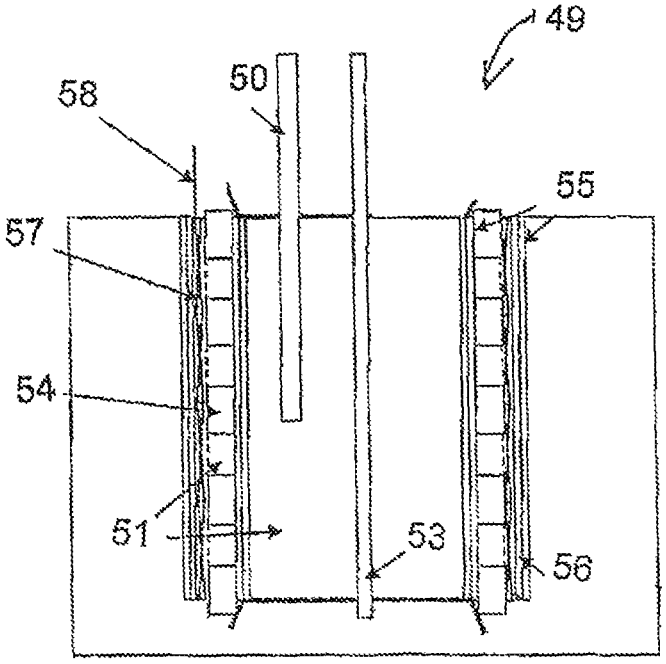
FIG.11
(Amended)

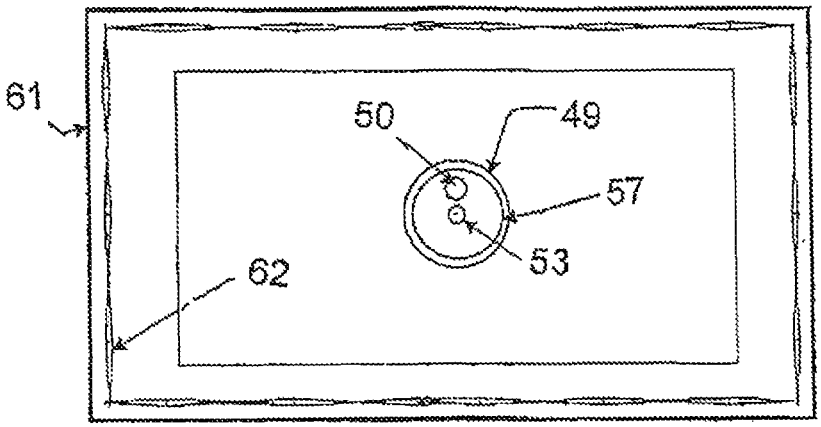
FIG.12
(Amended)

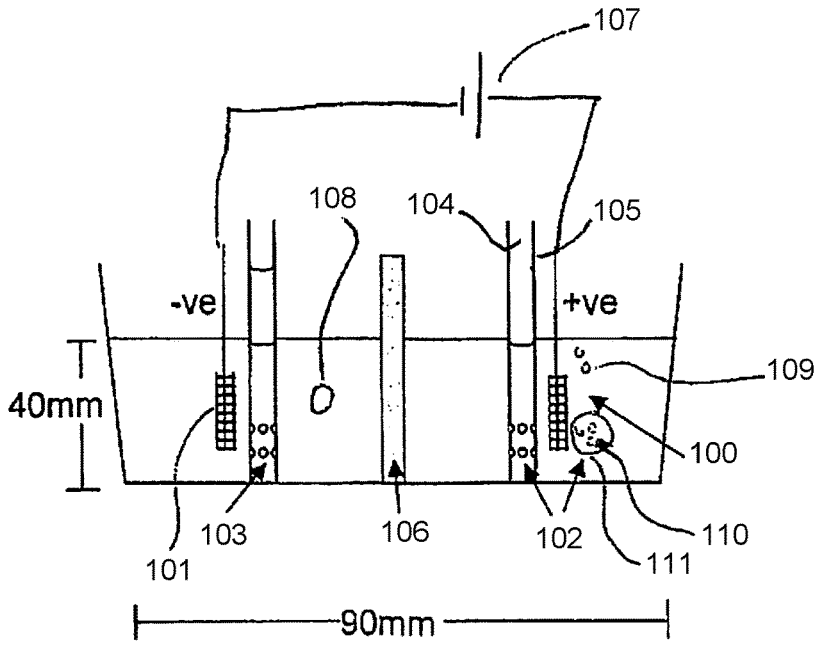
FIG. 13
(Amended)
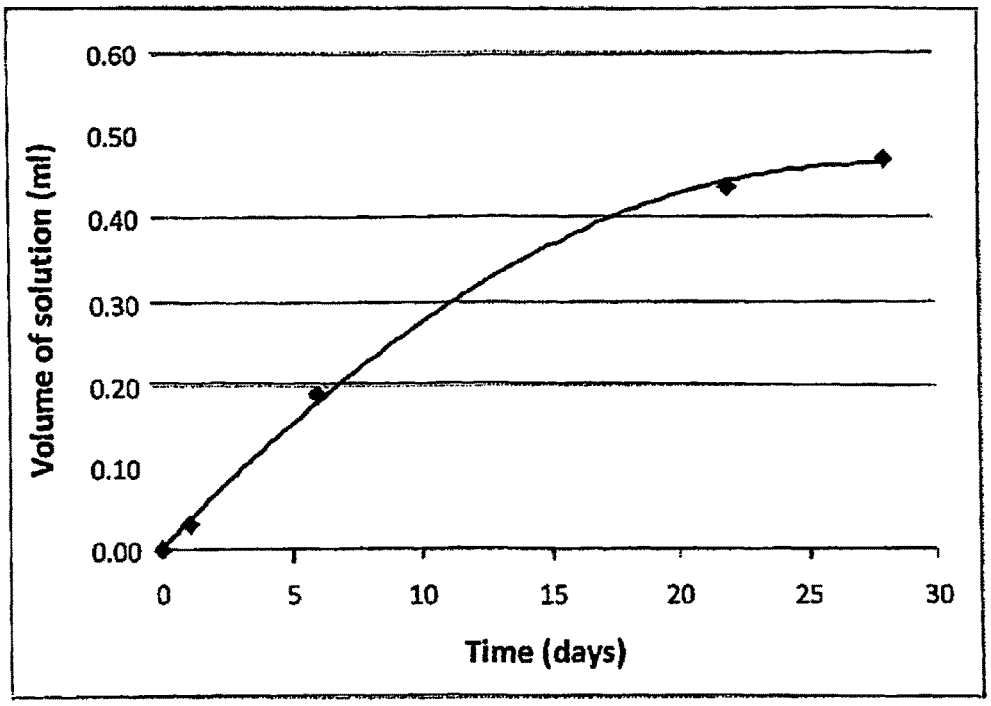
FIG. 14
(Amended)

CORROSION PROTECTION USING A SACRIFICIAL ANODE

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

*Notice: More than one reissue application has been filed for the Reissue of U.S. Pat. No. 10,053,782. The reissue applications are U.S. application Ser. Nos. 17/847,400 and 16/999,744 (the present application). Application Ser. No. 17/847,400 filed on Jun. 23, 2022 is a divisional reissue application of reissue application Ser. No. 16/999,744 filed on Aug. 21, 2020 which is a reissue of U.S. Pat. No. 10,053,782.*

This application is a continuation in part application of application Ser. No. 13/553,498 filed Jul. 19, 2012 now issued to U.S. Pat. No. 8,961,746 on Feb. 24, 2015.

This invention relates to corrosion protection using a sacrificial material.

BACKGROUND OF THE INVENTION

U.S. Pat. No. 6,346,188 (Shuster) assigned to ENSER Corporation and issued Feb. 12, 2002 discloses a method for corrosion protection of marine piles in which an anode is located within a jacket surrounding the pile at water level and a battery is mounted on the pile above the water level for providing an impressed current between the anode of the jacket and the steel of the pile. The anode is preferably formed of titanium or other non-corroding materials which are high on the Noble scale. However the patent mentions that other materials such as zinc can be used but these are disadvantageous since they tend to corrode. The intention is that the battery have a long life and be maintained effectively so that the impressed current remains in place during the life of the marine pile bearing in mind that the salt water in the marine environment is particularly corrosive.

Such impressed current systems can use other types of power supply including common rectifiers which rectify an AC voltage from a suitable source into a required DC voltage for the impressed current between the anode and the steel. It is also known to provide solar panels for charging batteries to be used in a system of this type.

In all cases such impressed current systems require regular maintenance and checking of the status of the power supply to ensure that the power supply does not fail leading to unexpected and unacceptable corrosion of the steel within the structure to be protected. While such maintenance can be carried out and the power supply thus ensured, this is a relatively expensive process.

Alternatively galvanic systems can be used which avoid necessity for any power supply since the voltage between the steel and the anode is provided by selecting a suitable material for the anode which is sufficiently electro-negative to ensure that a current is generated to provide a corrosion protection. These systems have obtained considerable success and are widely used.

There are two primary limitations of ordinary galvanic anodes as used in steel reinforced concrete. The first relates to the mass of zinc per anode which, depending on the required current output, limits the useful life of the anode.

The second is the actual current output of the anode which may or may not be sufficient to halt corrosion of the steel. The current output is limited by the driving voltage, which is essentially a fixed property and varies with exposure conditions, age of the anode, and build up of corrosion products over time.

SUMMARY OF THE INVENTION

It is one object of the invention to provide an improved method for corrosion protection.

According to one aspect of the invention there is provided a method for corrosion protection of a metal section in an ionically conductive covering material comprising:

locating an impressed current anode in ionic contact with the ionically conductive material;

locating a sacrificial anode of a material which is less noble than the metal section in ionic contact with the ionically conductive material;

providing a DC power supply; and providing a connection of the DC power supply so as to apply a potential difference between the impressed current anode and the sacrificial anode.

Preferably the potential difference causes ions of the sacrificial anode material to move to the sacrificial anode.

Preferably there is provided an additive which acts to limit gassing from the sacrificial anode.

Preferably the additive is a surfactant.

Preferably the additive comprises cellulose.

Preferably the additive comprises alloying zinc metal with suitable elements such as nickel or indium which is arranged to reduce the hydrogen over-potential significantly and hence limit hydrogen gassing.

Preferably the method includes restricting dendritic growth of sacrificial anode material on the sacrificial anode.

Preferably the method includes causing moisture movement towards the sacrificial anode.

Preferably there is an ionically conductive membrane separator between the sacrificial anode and the impressed current anode.

Preferably the ionically conductive membrane separator is located around or adjacent to the sacrificial anode.

Preferably the ionically conductive membrane separator acts to contain sacrificial material at the sacrificial anode, to avoid dendritic growth of sacrificial anode material on the sacrificial anode beyond the membrane and to allow moisture movement to the sacrificial anode.

In one arrangement the sacrificial anode material or a portion thereof is provided as particles or powder. This can be associated with or intermixed with an ionically conductive filler material or electrolyte. In one example, the whole of the sacrificial anode can be provided in the particulate form associated with a connection member which provides the electrical connection to the steel or the DC power supply. That is the particles are in connection with the connector and are located at or adjacent the sacrificial anode connection. In this way when the DC voltage is applied the ions of the sacrificial anode material move toward and deposit on the particulate material to form additional sacrificial anode material. The sacrificial anode can include a solid core of the material at the connector or may not. Where there is no core, the connector can be for example simply a pin of a suitable material such as brass or galvanized steel.

Preferably the sacrificial anode is connected to the steel while the DC power supply is connected to the impressed current anode so that the cathodic protection is carried out by the DC power supply while the recharging or regeneration of the sacrificial anode is occurring. However this is not essential and the recharging or regeneration can be carried out as a separate step.

Preferably the method includes increasing galvanic current generated by the sacrificial anode subsequent to application of the potential difference relative to that before the application.

Preferably the method includes increasing alkalinity at the surface of the sacrificial anode.

Preferably the increased alkalinity acts to dissolve zinc corrosion products into soluble zincate ions.

Preferably the method includes limiting current flowing to the sacrificial anode by the potential difference such that the sacrificial anode is reactivated without recharging the sacrificial anode with additional ions of the sacrificial material.

Preferably the method includes causing water movement from the negatively charged impressed current anode to the positively charged sacrificial anode.

Preferably the method includes increasing a total surface area of the sacrificial anode material at the sacrificial anode.

Preferably the method includes increasing a quantity of hydroxyl ions at the immediate vicinity of the sacrificial anode.

The sacrificial anode can be formed of solid anode material which can be cast, rolled or formed, or it can be formed of powdered or finely divided sacrificial anode material or zinc oxide.

According to a second aspect of the invention there is provided an anode apparatus for cathodically protecting a metal section in an ionically conductive material, the anode apparatus comprising:

a sacrificial anode of a material which is less noble than the metal section;

an impressed current anode;

the sacrificial anode and the impressed current anode comprising components of the anode apparatus so that, when the components of the anode apparatus are located in contact with the ionically conductive material, each of the sacrificial anode and the impressed current anode is in ionically conductive communication with the other and with the metal section;

the impressed current anode and the sacrificial anode being electrically separated to prevent electrical communication therebetween;

an electrical connection to the sacrificial anode;

an electrical connection to the impressed current anode and an ionically conductive membrane separator between the sacrificial anode and the impressed current anode.

Preferably the ionically conductive membrane separator is located around or adjacent to the sacrificial anode.

Preferably the ionically conductive membrane separator is arranged to contain sacrificial material at the sacrificial anode, to avoid dendritic growth of sacrificial anode material on the sacrificial anode beyond the membrane and to allow moisture movement to the sacrificial anode.

Preferably there is provided a DC power supply.

Preferably the impressed current anode is perforated so to allow passage of ionic current to pass through the impressed current anode.

Preferably the impressed current anode surrounds at least a portion of the sacrificial anode.

Preferably the sacrificial anode and the membrane separator, and optionally the impressed current anode, comprise common components of a common anode assembly.

Alternatively the impressed current anode and the sacrificial anode comprise side by side elements.

Preferably there is provided an ionically conductive filler material adjacent to the sacrificial anode.

Preferably the sacrificial anode is re-charged by locating an impressed current anode in ionic contact with the ionically conductive material and connecting a first terminal of a DC power supply to the impressed current anode so as to cause ionic current to flow through material to cause sacrificial anode ions to be deposited on the sacrificial anode.

Preferably sacrificial anode ions are present in the ionically conductive material.

Preferably the re-charging causes hydroxyl ions to be generated at the surface of the sacrificial anode.

Preferably the re-charging causes an alkali environment to be re-generated around the sacrificial anode.

Preferably, in a first step, the sacrificial anode is connected to the metal section to provide corrosion protection of the metal section by the corrosion of the sacrificial anode which results in the formation of corrosion products of the sacrificial anode and, in a second step after corrosion of the sacrificial anode has occurred, the current supplied by a DC power supply causes the ions of the sacrificial material, from the corrosion products of the sacrificial anode, to be re-deposited on the sacrificial anode.

Preferably the DC power supply is applied temporarily.

Preferably there are ions of the sacrificial material available to be deposited.

Preferably the ions of the sacrificial material are soluble.

Preferably the ions of the sacrificial material are electrochemically mobile.

Preferably the metal section is steel and the ionically conductive material is concrete or mortar.

Preferably there is provided a connection between the sacrificial anode and the metal section so that the sacrificial anode provides corrosion protection.

Preferably the connection between the sacrificial anode and the metal section remains in place when the DC power supply is in operation.

In one arrangement, at least a portion of the sacrificial anode is fabricated in the ionically conductive material by depositing ions of the sacrificial material, In this case the method can include incorporating ions of the sacrificial material in the ionically conductive material where the sacrificial anode is generated in the ionically conductive material by depositing the incorporated ions of the sacrificial material on the sacrificial anode.

Preferably the second terminal of the DC power supply is connected to the sacrificial anode and to the metal section.

Preferably the connection of the DC power supply across the impressed current anode and the metal section creates a current between the metal section and the impressed current anode which is used to passivate the metal section.

Preferably the connection of the DC power supply across the impressed current anode and the metal section creates a current between the metal section and the impressed current anode which is used to provide corrosion protection to the metal section while the ions of the sacrificial material are being deposited on the sacrificial anode.

Preferably the sacrificial anode and the impressed current anode comprise common components of an anode apparatus so that, when the common components of the anode apparatus are located in the ionically conductive material, each of the sacrificial anode and the impressed current anode is in ionically conductive communication with the other and with the metal section.

Preferably the impressed current anode and the sacrificial anode are electrically separated to prevent electrical communication therebetween.

Preferably the impressed current anode is perforated so to allow passage of ionic current in the ionically conductive material to pass through the impressed current anode.

Preferably the sacrificial anode forms a rod (or tubular element/component) and the impressed current anode forms a sleeve surrounding the rod.

Preferably the impressed current anode and the sacrificial anode comprise side by side plates.

Preferably there is provided an ionically conductive filler material adjacent to the sacrificial anode.

Preferably the ionically conductive filler material is different from the ionically conductive material.

Preferably the ionically conductive filler material contains sacrificial anode ions Preferably the ionically conductive filler material is porous.

Preferably the ionically conductive filler material is deformable or a gel.

Preferably the ionically conductive filler material contains at least one activator to ensure continued corrosion of the sacrificial anode.

Preferably the ionically conductive filler material is hydroscopic.

Preferably the ionically conductive filler material has a pH sufficiently high for corrosion of the sacrificial anode to occur and for passive film formation on the sacrificial anode to be avoided.

Preferably there is provided a plurality of sacrificial anodes and wherein the impressed current anode is separate from said sacrificial anodes.

Preferably there is provided a plurality of impressed current anodes and wherein the sacrificial anode is separate from said impressed current anodes.

Preferably the impressed current anode is arranged to be mounted temporarily to provide current through a surface of the ionically conductive material.

Preferably there are sacrificial anode ions available to be deposited.

Preferably the sacrificial anode ions are soluble.

Preferably the sacrificial anode ions are electrochemically mobile.

Although not essential, typically this arrangement is designed for use where the metal section is steel and the ionically conductive material is concrete or mortar.

In some cases a portion of the structure or the sacrificial anode is wetted.

In some cases the impressed current anode is mounted temporarily for the purpose of causing the ions of the sacrificial material to be deposited.

The above methods can be carried out using an anode apparatus for catholically protecting a metal section in an ionically conductive material, the anode apparatus comprising:

a sacrificial anode of a material which is less noble than the metal section;

an impressed current anode;

the sacrificial anode and the impressed current anode comprising components of the anode apparatus so that, when the components of the anode apparatus are located in contact with the ionically conductive material, each of the sacrificial anode and the impressed current anode is in ionically conductive communication with the other and with the metal section;

the impressed current anode and the sacrificial anode being electrically separated to prevent electrical communication therebetween;

a first electrical connector arranged for connection to the sacrificial anode;

and a second electrical connector arranged for connection to the impressed current anode.

This anode apparatus can be used in a method for corrosion protection of a metal section in an ionically conductive covering material where the impressed current anode and the sacrificial anode are both located in contact with the ionically conductive material and a DC power supply is connected between the impressed current anode and the metal section so as to create a current between the metal section and the impressed current anode which is used to passivate the metal section and, while the first step is terminated, there is a connection between the sacrificial anode and the metal section so that the sacrificial anode continues to provide corrosion protection.

Preferably this is used where, in a first step, the sacrificial anode is connected to the metal section to provide corrosion protection of the metal section by corrosion of the sacrificial anode which generates corrosion products of the sacrificial anode material in the ionically conductive material and wherein, in a second step after corrosion of the sacrificial anode has occurred, the current applied by the DC power supply through the ionically conductive material causes the sacrificial anode ions, from the corrosion products of the sacrificial anode material, to be re-deposited on the sacrificial anode. In a similar manner, sacrificial anode ions may be deposited to create a sacrificial anode or to increase the size of an existing sacrificial anode.

In this method the recharging or deposition process can be used repeatedly and periodically to ensure continued operation of the anode apparatus over a much longer period than would be possible with the given quantity of the zinc or other galvanic material such as aluminum, magnesium or other material (which is less noble than the metal section to be protected) in the anode. This can be done, for example, using a solar cell where the re-charging occurs each day. Alternatively and more typically, this is done by periodic maintenance where a worker visits the site periodically and applies a power supply for a period of time necessary to effect the re-charging.

In one particular aspect of the invention, which is independently patentable, there is provided an apparatus for cathodically protecting a metal section in an ionically conductive material comprising an impressed current anode and a conductor which can eventually form a sacrificial anode where the sacrificial anode and the impressed current anode comprising components of the anode apparatus so that, when the components of the anode apparatus are located in contact with the ionically conductive material, each of the sacrificial anode and the impressed current anode is in ionically conductive communication with the other and with the metal section. In this way the above described charging of the sacrificial anode can take place wholly in situ so that the ions are applied onto the conductor by deposition from the ionically conductive material. As set out above, the impressed current anode and the sacrificial anode should be electrically separated to prevent electrical communication therebetween In one arrangement, to provide the ions, the impressed current anode can be formed of the sacrificial anode material such as zinc so that application of the DC power causes corrosion of the impressed current anode and generates sacrificial anode ions which are then available to be deposited on the sacrificial anode. However the ions of the sacrificial material can be provided in the ionically conductive material itself or in an additional filler material at or adjacent the sacrificial anode.

Preferably, simultaneously with the connecting of the second terminal of the DC power supply to the sacrificial anode, the second terminal of the DC power supply is also connected to the metal section such that the first terminal of the power supply is connected to the impressed current anode and the second terminal of the power supply is connected to the sacrificial anode and the metal section. This arrangement can be used not only to cause the recharging action but also acts to provide enhanced protection of the metal section by generating a protective current which may be greater than the galvanic current alone to effect passivation of the steel (metal section) while providing the option of re-charging the sacrificial anode at the same time.

Connecting the sacrificial anode to the metal section can provide a galvanic corrosion protection back up to provide corrosion protection to the metal section when the DC power supply or impressed current anode system is not functional. Having the sacrificial anode connected to the metal section provides a simple, automatic corrosion protection back up system should the impressed current system become non-operational.

The term impressed current anode used herein is intended to distinguish from the sacrificial anode where the sacrificial anode is formed of a material, typically of zinc, which is less noble than the metal section so that it preferentially corrodes relative to the metal section to be protected. The impressed current anode is one which is used in conjunction with an external power supply and does not need to be less noble than the metal section. Typically such impressed current anodes are formed of titanium, carbon and other noble metals and oxides which do not corrode readily, or they can be formed of iron or less noble materials such as zinc.

The sacrificial anode and the impressed current anode preferably form common components of the anode apparatus. That is, the apparatus as supplied for use includes both components as a common system. However they may or may not be assembled into a common attached construction which can be inserted into the material or applied onto the surface as a common assembly. A common assembly is, of course, preferred for convenience but the components can be inserted separately, for example, in one or in separate drilled holes or slots in a concrete construction, installed in new concrete or applied separately to the concrete surface or elsewhere. The impressed current anode for example can be applied temporarily to the outer surface of the ionically conductive material such as a plate attached to the exterior surface of the concrete for recharging sacrificial anodes within the body of the concrete.

The apparatus preferably includes as a part of the apparatus a DC power supply with positive and negative terminals. This can be any form of device which can provide a DC output at a required voltage such as a battery, solar cell or it can be a rectifier. The power supply may also be supplied separately and/or temporarily so that it is not itself an integral component of the apparatus. However in the method of use of the system a suitable source of DC power must be used at least during a part of the time.

As a further component of the apparatus, there is preferably provided a switchable junction box having connectors for connection to the positive and negative terminals of the power supply, to the first and second electrical connectors and to the metal section. This can, however, be provided as separate components, again not an integral part of the system. Also connections can be made on site without a specific switchable junction box.

Preferably the impressed current anode is perforated so to allow passage of ionic current to pass through the impressed current anode. However this is not essential since the impressed current anode and the sacrificial anode can comprise separate elements merely located in adjacent relationship for cooperation in the material. The ionic current must pass from the sacrificial anode to the metal section but this can pass through or around the impressed current anode or around parts of the impressed current anode. However, where the sacrificial anode and the impressed current anode are formed as a common assembly, it is preferred that the ionic current passes through or around the impressed current anode. The impressed current anode may therefore be formed as separate pieces or spaced apart to allow current to pass to the metal section. Thus for example the impressed current anode can be perforated by macroscopic holes formed through or cut into the anode.

In another preferred example, the impressed current anode is formed from electrically conductive components in a matrix and there are provided spaces in the matrix between the conductive components to allow the ionic current to pass through the matrix. This can be achieved, for example, by sintering the anode material and/or other materials or reducing oxides to form an electrically conductive matrix.

In order to obtain uniform, symmetrical deposition of the anode material on the sacrificial anode during recharging, when that process is being used, it is preferred that the impressed current anode surrounds the sacrificial anode, that is the impressed current anode is arranged in a plane containing the sacrificial anode to fully, substantially fully, partially, or discretely surround the sacrificial anode so that ionic current passing to or from the sacrificial anode around 360 degrees in the plane passes through the impressed current anode. If the impressed current anode is arranged wholly or partly to one side, the deposition will occur preferentially to that side and hence may be less effectively deposited. Therefore preferably, in a coaxial arrangement, the sacrificial anode forms a rod or cylindrical element and the impressed current anode forms a sleeve surrounding the rod or element. The cylindrical element may comprise solid sacrificial material and/or sacrificial anode material in the form of particles or powder which may be intermixed with ionically conductive filler material. The cylindrical element of sacrificial anode material may be contained within or encased in an ionically conductive sleeve or membrane. Alternatively, the sacrificial anode may be in the form of a plate or rod or ribbon or other similar element and the impressed current anode may be placed on one side of the plate such that the deposition may occur primarily on the one side of the sacrificial anode to which the impressed current anode is placed.

Preferably there is provided an ionically conductive filler material which is not the ionically conductive material itself which is located between the impressed current anode and the sacrificial anode and thus preferably in the coaxial arrangement, the filler material forms a cylinder surrounding the rod or cylindrical element. Preferably, the ionically conductive filler material is in ionic contact with at least part of the surface of the sacrificial anode.

For use during a sacrificial or galvanic phase of operation of the above method, the ionically conductive filler material preferably contains at least one activator to ensure continued corrosion of the sacrificial anode. However the activator can also be located at other positions in the system. Suitable filler materials can be in the form of solids, gels or liquids.

Gels can include carbomethyl cellulose, starches and their derivatives, fumed silica or alkaline polymer gel electrolytes, e.g. acrylic acid in a potassium hydroxide solution or polyvinyl chloride/acetate-KOH composites with additions of bentonite, propylene carbonate and or alumina. The alkali hydroxide in these gels acts as a suitable activator.

Other suitable activators include alkali hydroxides, humectants, catalytic materials and other materials which are corrosive to the sacrificial anode metal. Activators may be used alone or in combination.

Other additives may be included for specific purposes. One such specific but important function is the prevention, as much as possible, of gassing at the anode either at discharging or during recharge. The addition of zinc oxide within the activator achieves reduction of gassing of the active zinc during discharge and also permits overcharge of the anode without damage. Other additions that limit gassing during discharge or during anode inactivity are surfactants. Examples of these are perfluorosurfactants and polyethylene glycol (PEG) of intermediate molecular weight (300-1000), more preferably 400, which also acts as cathodic inhibitor. Surfactants are also known to promote more uniform and efficient dissolution of the metal.

More importantly, gassing during recharging of the anode should be avoided so that a more uniform solid metal is formed. The use of additives, such as cellulose or alloying zinc metal with suitable elements (<10%) such as nickel or indium, can reduce the hydrogen over-potential significantly and hence limit hydrogen gassing.

These additives reduce dendritic growth of the deposited metal resulting in a more even and uniform deposit. Generally the additives are specifically adsorbed at rapid growth sites such as dendrites and restrict further growth so new growth sites are initiated.

In the case of zinc or zinc powder, additions of lead, bismuth, calcium and aluminum improve uniformity of material consumption and utilisation.

For use during a sacrificial or galvanic phase of operation of the above method, the ionically conductive filler material preferably has a pH sufficiently high for corrosion of the sacrificial anode to occur and for passive film formation on the sacrificial anode to be avoided. Alternatively, the filler may have a lower pH and/or contain activators for corrosion of the sacrificial anode to occur and for passive film formation on the sacrificial anode to be avoided.

The anode and methods herein are preferably designed for use where the metal section is steel and the ionically conductive material is concrete or mortar.

The anode apparatus including the impressed current and sacrificial components is typically buried in the concrete or other solid material so that it is fully encased by the concrete, but this is not essential and the anode may be only partially buried or in physical or ionic contact with the concrete.

The anode apparatus including the impressed current and sacrificial components may be surrounded by an encapsulating material or ionically conducting filler material which may be a porous material or porous mortar material. Suitable encapsulating materials can be inorganic or organic and may be any cementitious, polymer or non-cementitious material or mortar including geopolymers or modified portland cements. The encapsulating material may be solid, gel or liquid and may be deformable.

The intention is therefore, in the arrangement described in more detail hereinafter, to marry a galvanic anode with an impressed current anode for use with an impressed current and/or re-chargeable galvanic anode system. The configuration allows the impressed current anode to deliver current either to the steel reinforcement or the galvanic anode separately, or to both the steel reinforcement and the galvanic anode concurrently. The anode assembly can be used in three different ways, that is, a) as a normal galvanic anode, b) as an impressed current anode, and c) importantly, as a rechargeable galvanic anode. The assembly preferably includes an inner solid and/or granular zinc core acting as the galvanic anode, surrounded by or interspersed with a suitable activating electrolyte. The zinc and activator are preferably encased within a porous or mesh-type impressed current electrode.

The galvanic anode provided herein can therefore be flexible in operation so that continuous protection can be provided to a structure or structural component over periods compatible with impressed current corrosion protection systems.

The configuration can allow the impressed current anode to deliver cathodic current either to the steel reinforcement, to the galvanic anode or to the steel reinforcement and galvanic anode together. The anode assembly is to be used in three different ways, viz., as a normal galvanic anode, as an impressed current anode and most importantly, as a rechargeable galvanic anode. The latter capability allows multiple use of the same mass of zinc as it is recycled into the activating electrolyte and back from the electrolyte in the recharging process, eliminating the need for the use of larger volume anodes for long term protection.

In a preferred arrangement in an alkaline activator, the corrosion product of zinc is ultimately believed to be primarily zinc oxide. It is possible, therefore, to reverse the corrosion process and redeposit zinc metal back into the anode assembly. The arrangement described herein provides a method of re-depositing zinc metal without having to remove the anode assembly from the structure it is protecting. A counter or impressed current electrode which can be used as an anode for re-charging the zinc is provided. This counter electrode is preferably part of the anode assembly. The same electrode can then be utilised if there is a need to change the setup into an impressed current system.

The sacrificial anode may be any of the more electronegative materials such as zinc, aluminum, magnesium or alloys thereof.

The DC power supply can be a battery. The power supply may be a rectifier generating DC power from an AC supply voltage. Preferably the DC power supply has a potential greater than 1.5V. Where the power supply is a battery it can be rechargeable. Where the power supply is a battery it can be replaceable in the assembly. This is a convenient way periodically to do the recharge and/or provide an additional step of the impressed current to the steel by inserting a new battery and just leaving it until it becomes depleted, whereupon and the system then works galvanically until a later time when the depleted battery is removed and another one is inserted. The battery can be mounted at any convenient location, such as in the junction box or monitoring unit or somewhere convenient. A single battery can supply power to a group of anodes.

The power supply may include a solar panel which drives the impressed current anode and rechargeable galvanic anode so as to provide long term protection when the solar power is on and off.

According to another aspect of the invention there is provided a method for corrosion protection of a metal section in an ionically conductive covering material comprising:

locating an impressed current anode in contact with the ionically conductive material;

locating a sacrificial anode of a material which is less noble than the metal section in contact with the ionically conductive material;

providing a DC power supply;

providing a connection of the DC power supply between the impressed current anode and the metal section so as to create a current between the metal section and the impressed current anode to provide corrosion protection of the metal section;

and providing a connection between the sacrificial anode and the metal section so that the sacrificial anode can provide corrosion protection of the metal section.

The connection between the impressed current anode and the metal section and the connection between the sacrificial anode and the metal section can be in place simultaneously or either can be connected when required. The connection of either can be carried out manually using simple connectors or using a switch box or by an automatic control system.

In one arrangement of the above method, the connection of the DC power supply provides an initial impressed current and, when the initial impressed current is terminated, the connection between the sacrificial anode and the metal section continues to provide corrosion protection.

In another arrangement of the above method, the connection between the sacrificial anode and the metal section provides corrosion protection and, subsequent to a period of the corrosion protection provided by the sacrificial anode, the DC power supply is connected between the impressed current anode and the metal section causing the metal section to be further protected. This can be carried out periodically during the operation of the sacrificial anode. After initial installation, the first action in protection can be either the sacrificial anode or the impressed current anode as selected by the person skilled in the art in accordance with the status of the installation.

In both cases, the connection of the sacrificial anode can be in place while the impressed current is connected or can be connected when the impressed current is terminated.

Preferably the initial current provided by the impressed current anode is sufficient to passivate the metal section. However the specific effect obtained in the first step is not essential and other effects can be obtained advantageously using this method.

Preferably the sacrificial anode and the impressed current anode comprise common components of the anode apparatus so that, when the common components of the anode apparatus are located in the ionically conductive material, each of the sacrificial anode and the impressed current anode is in ionically conductive communication with the other and with the metal section. However separate anode elements can be provided.

Preferably the impressed current anode and the sacrificial anode are electrically separated to prevent electrical communication therebetween.

Preferably there are provided connectors for connection to the positive and negative terminals of the power supply, with a first electrical connector connected to the impressed current anode, with a second electrical connector connected to the sacrificial anode and/or to the metal section.

Preferably the impressed current anode is perforated so to allow passage of ionic current in the ionically conductive material to pass through the impressed current anode. Many different techniques can be provided to obtain the effect of the perforation so that the ionic current can pass through.

Preferably the sacrificial anode forms a rod or tubular or cylindrical element and the impressed current anode forms a sleeve surrounding the rod or element. However other arrangements can be provided such as parallel or side by side plates.

Preferably there is provided an ionically conductive filler material adjacent to the sacrificial anode where the ionically conductive filler material is different from said ionically conductive material.

Preferably the ionically conductive filler material contains at least one activator to ensure continued corrosion of the sacrificial anode. Many different types of activator are available and can be used.

Preferably the ionically conductive filler material has a pH sufficiently high for corrosion of the sacrificial anode to occur and for passive film formation on the sacrificial anode to be avoided.

In one example there is provided a plurality of separate sacrificial anodes and the impressed current anode is separate from said sacrificial anodes.

In another example there is provided a plurality of impressed current anodes and wherein the sacrificial anode is separate from said impressed current anodes. However, typically the sacrificial anode and the impressed current anodes are parts of a common construction.

In another arrangement which can be used, the impressed current anode is mounted temporarily to provide current through a surface of the ionically conductive material. That is the impressed current anode is arranged to be mounted (utilized/installed and operated) temporarily during charging of the sacrificial anode.

The construction and methods proposed herein are designed particularly where the metal section is steel and the ionically conductive material is concrete or mortar. However the same arrangements may be used in other corrosion protection systems such as for pipes or other constructions in soil, and in many other systems where such anodes can be used.

Preferably there is provided a porous or deformable material to absorb corrosion products from the sacrificial anode. This may be an encapsulating component or may be in the sacrificial anode itself.

Preferably the assembly includes a reinforcing layer, such as disclosed in U.S. Pat. No. 7,226,532 issued Jun. 5, 2007 to Whitmore, which is incorporated by reference, to restrain and resist forces such as expansion, contraction and deformation forces which may be caused by corrosion of the anodes, deposition of sacrificial anode ions and other physical/environmental forces such as freezing, thawing, wetting, drying and thermal expansion/contraction.

BRIEF DESCRIPTION OF THE DRAWINGS

One embodiment of the invention will now be described in conjunction with the accompanying drawings in which:

FIG. 1 is a schematic illustration of a corrosion protection method according to the present invention using a first arrangement of anode apparatus.

FIG. 11 is a cross-sectional view of a second example of an apparatus according to the present invention.

FIG. 12 is a plan view of a test arrangement for the embodiment of FIG. 11.

FIG. 13 is a schematic illustration of an experimental specimen used for determining solution movement at an applied current between two electrodes embedded in highly alkaline mortar.

FIG. 14 is a graph showing an increase in volume of solution in the tube adjacent to the negatively charged electrode in FIG. 13.

In the drawings, like characters of reference indicate corresponding pads in the different figures.

DETAILED DESCRIPTION

Figure 2:
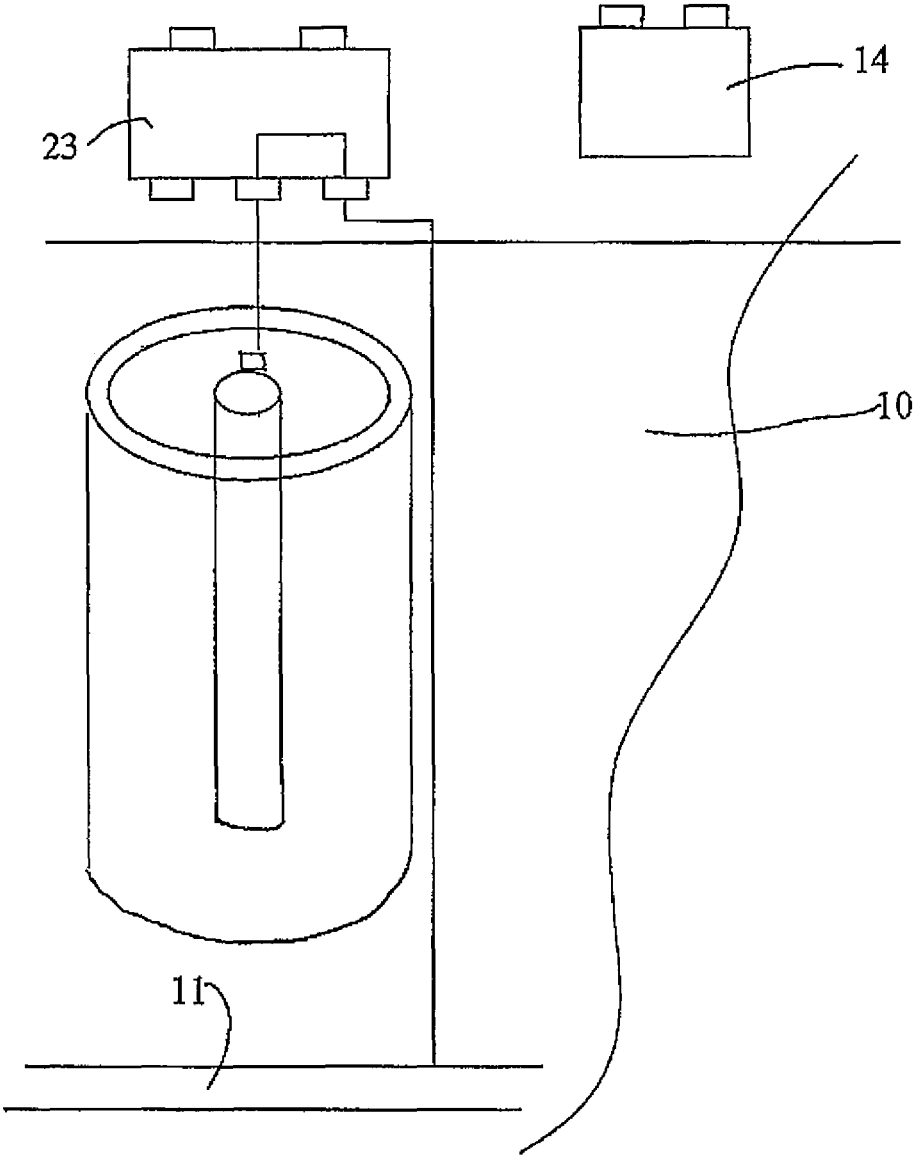
FIG. 2 is the schematic illustration of FIG. 1 showing the connection of the components for operation in the sacrificial protection mode.

In FIG. 1 is shown a covering material 10 within which is embedded steel material 11 and an anode body 12.

The covering material 10 is a suitable material which allows communication of ions through the covering material between the anode body 12 and the steel 11. The covering material is generally concrete but can also include mortar or masonry materials, or soil, water or other ionically conductive material, where there is a steel structure which requires corrosion protection to prevent or inhibit corrosion. The steel material 11 is illustrated as being a reinforcing bar arrangement but other steel elements can be protected in the manner of the arrangement shown herein including steel structural members such as lintels, steel beams and columns, pipes, tanks or other elements in contact with the concrete or other covering material.

The anode member may include or be constructed in part as the arrangement shown in U.S. Pat. No. 6,165,346 issued Dec. 26, 2000; U.S. Pat. No. 6,572,760 issued Jun. 3, 2003 U.S. Pat. No. 6,793,800 issued Sep. 21, 2004, U.S. Pat. No. 7,226,532 issued Jun. 5, 2007, U.S. Pat. No. 7,914,661 issued Mar. 29, 2011, and U.S. Pat. No. 7,959,786 issued Jun. 14, 2011 of the present inventor, and in U.S. Pat. No. 6,022,469 (Page) issued Feb. 8, 2000 and U.S. Pat. No. 6,303,017 (Page and Sergi) issued Oct. 16, 2001 assigned to Vector Corrosion Technologies and in U.S. Pat. No. 6,193,857 (Davison) issued Feb. 27, 2001 assigned to Vector Corrosion Tech., Bennett U.S. Pat. No. 6,217,742 issued Apr. 17, 2001, U.S. Pat. No. 7,160,433 issued Jan. 9, 2007, U.S. Pat. No. 8,157,983 issued Apr. 17, 2012 and U.S. Pat. No. 6,471,851 issued Oct. 29, 2002 assigned to Vector Corrosion Technologies, Giorgini U.S. Pat. No. 7,998,321 issued Aug. 16, 2011, Schwarz U.S. Pat. No. 7,851,022 issued Dec. 14, 2010, Glass et al. U.S. Pat. No. 8,211,289 issued Jul. 3, 2012, U.S. Pat. No. 8,002,964 issued Aug. 23, 2011, U.S. Pat. No. 7,749,362 issued Jul. 6, 2010, U.S. Pat. No. 7,909,982 issued Mar. 22, 2011, and U.S. Pat. No. 7,704,372 issued Apr. 27, 2010 assigned to Vector Corrosion Technologies, which are incorporated by reference and to which reference should be made for further details as required.

A DC power supply 14 is provided which generates a voltage at terminals 15 and 16 of the power supply.

In the embodiment shown the power supply is formed by a battery which may be a lead acid battery with an output of 6 or 12 volts and a lifetime of 1 to 20 weeks, or may be a zinc air battery well known and commercially available which provides an output voltage of the order of 1.5 volts and has a lifetime of the order of 3 to 5 years. The voltage may drop during current draw in operation from the nominal value of 1.5 volts to as low as 1.0 volts. Such batteries of this type are commercially available from ENSER Corporation or others. A suitable battery may have a capacity up to 1200 ampere hours.

Alternative power supplies may be used including solar panels and conventional rectifiers which require an exterior AC supply voltage and which convert the AC supply into a DC voltage at the terminals 15 and 16.

The anode apparatus 12 includes a sacrificial anode 20 of zinc or other material which is less noble than the metal section together with an impressed current anode 21. The sacrificial anode 20 is in the form of a rod and the impressed current anode 21 is in the form of a sleeve surrounding the rod with an ionically conductive filler material 22 which is generally not the ionically conductive material 10 located as a cylinder between the impressed current anode 21 and the sacrificial anode 20. In this coaxial and combined structure, the impressed current anode is arranged in a radial plane of a central axis of the rod to fully surround the circumference of the sacrificial anode so that ionic current passing to or from the sacrificial anode around 360 degrees in the plane generally passes through the impressed current anode on its path to the steel 11.

Thus the sacrificial anode 20 and the impressed current anode 21 form common components of the anode apparatus 12 so that each of the sacrificial anode 20 and the impressed current anode 21 is in ionically conductive communication with the other and with the metal section. The filler material is not electrically conductive so that the impressed current anode and the sacrificial anode are electrically separated to prevent electrical communication therebetween.

A switchable junction box 23 is provided having connectors 231 and 232 for connection to the positive and negative terminals of the power supply. The box further includes a connector 233 to a lead 236 to the impressed current anode 21, a connector 234 to a lead 237 to the sacrificial anode 20 and a connector 235 to a lead 238 to the metal section 11. Leads 236, 237 and 238 are preferably wires and are preferably corrosion resistant. Lead 236 has the greatest need for corrosion resistance as it is connected to an impressed current anode during operation. Examples of corrosion resistant materials for the impressed current connection include titanium, niobium, nickel, platinized wires and insulated wires.

The impressed current anode is perforated either with macroscopic holes 211 or a microscopic structure so to allow passage of ionic current from the anode 20 to pass through the impressed current anode. Macroscopic holes can be provided by forming the impressed current anode in separate pieces.

In the arrangement where the anode 21 is perforated microscopically, the impressed current anode has sufficient porosity and ionically conductive material within the spaces between the impressed current anode material to allow the ionic current to pass through the impressed current anode.

The ionically conductive filler material 22 preferably contains at least one activator to ensure continued corrosion of the sacrificial anode. The ionically conductive filler material preferably has a pH sufficiently high for corrosion of the sacrificial anode to occur and for passive film formation on the sacrificial anode to be avoided or minimized. For zinc, this pH is typically greater than 12 and may be greater than 13, 13.3 or 13.4. It is preferable that the zinc corrosion products remain partially or substantially soluble. This can be achieved by suitable pH or by incorporating ions or other chemicals which are corrosive to the sacrificial anode material and/or prevent the surface of the sacrificial anode material from passivating. Examples of materials which help to produce soluble corrosion products and/or prevent passivation are disclosed in the patent documents referenced above.

The ionically conductive filler material 22 is also preferably highly ionically conductive, hygroscopic, and will accommodate volume changes as the sacrificial anode is charged and discharged. The ionically conductive filler material may also be porous or deformable to accommodate these changes.

Figure 6:
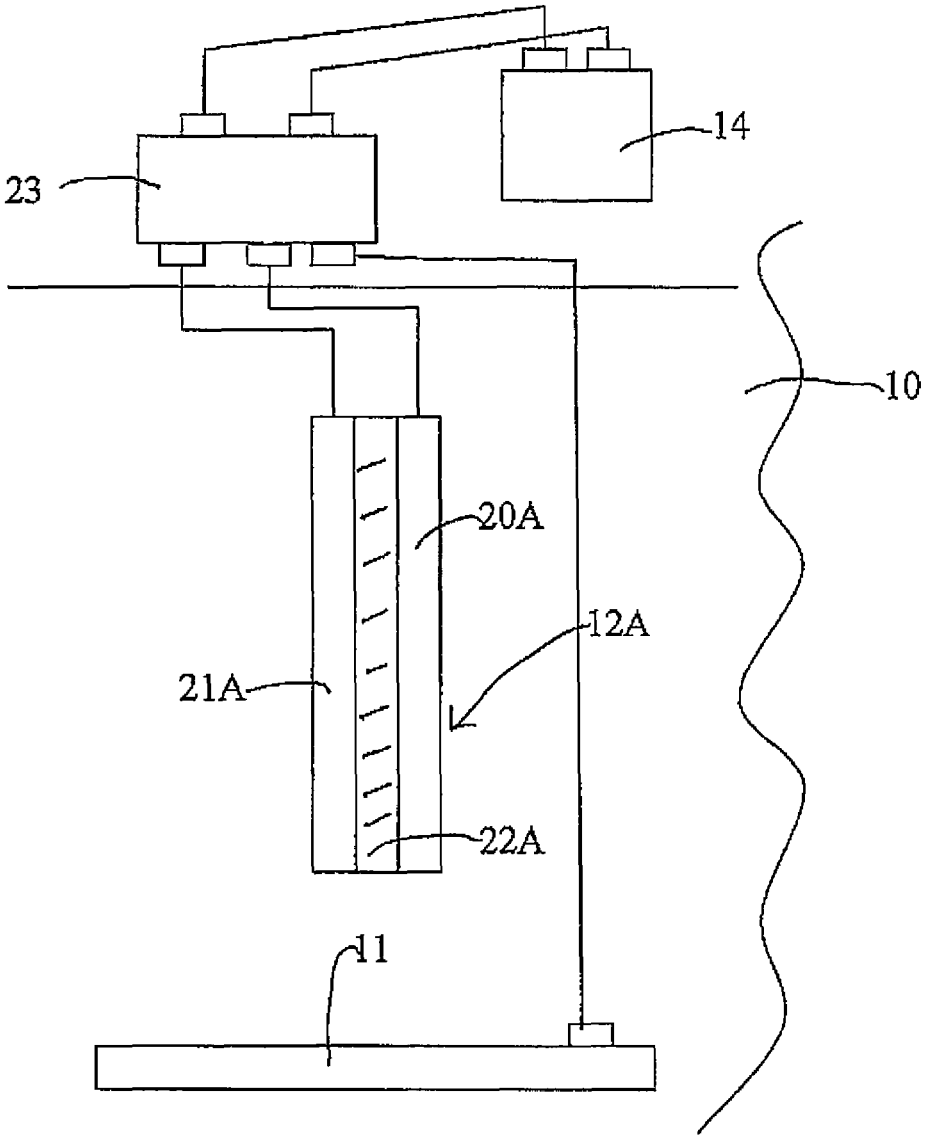
FIG. 6 is a schematic illustration of a corrosion protection method according to the present invention using a second arrangement of anode apparatus.

In FIG. 6 is shown a schematic illustration of the method using a second arrangement of anode apparatus in which the sacrificial anode 20A and the impressed current anode 21A are formed as two parallel plates, mesh, ribbon or wires with the filler material 22A therebetween. In this case the recharging of the sacrificial anode may occur primarily on one side. In an alternative construction, the two parallel layers of plates or mesh may be applied to the surface of the covering material.

Figure 7:
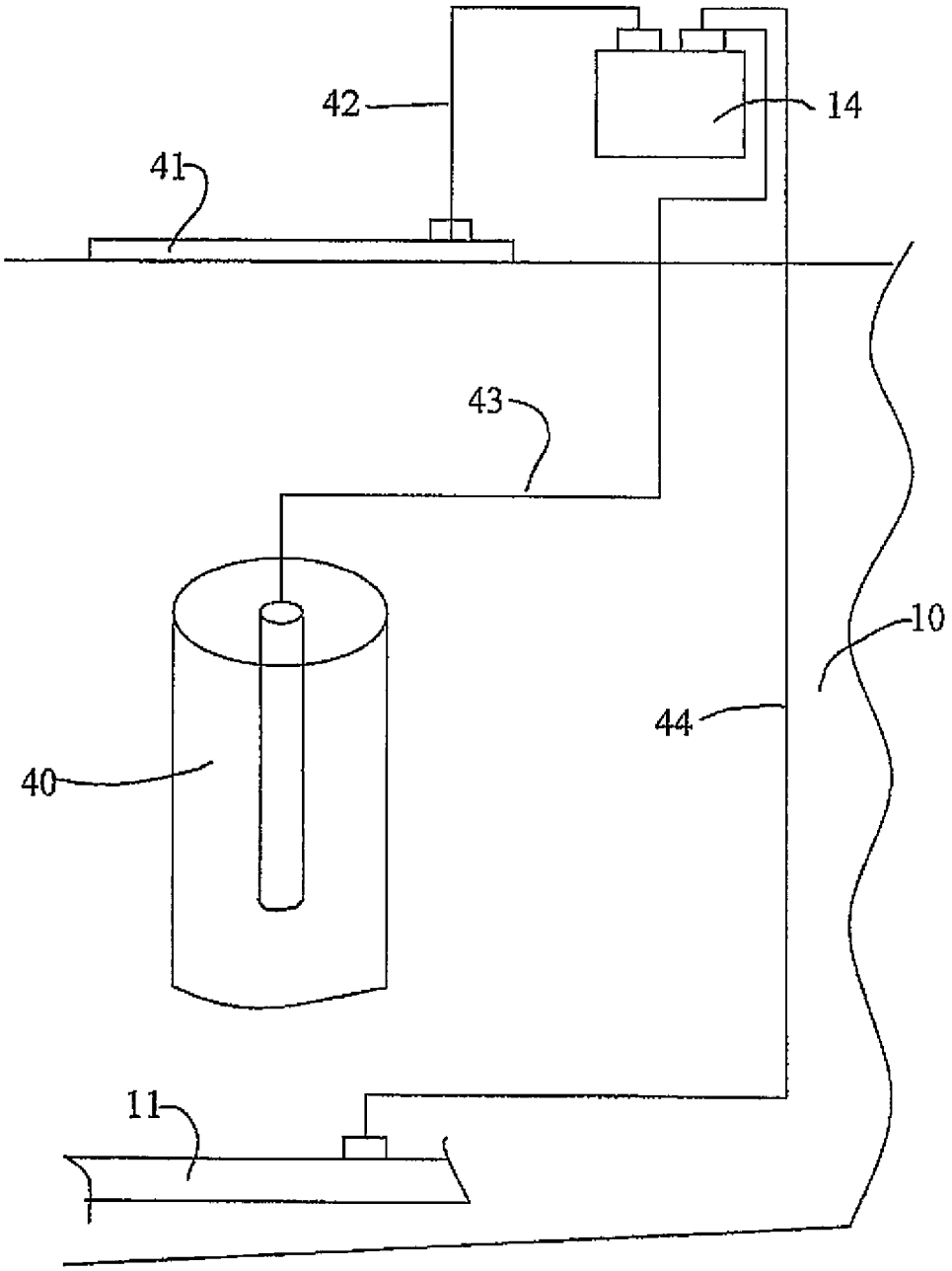
FIG. 7 is a schematic illustration of a further corrosion protection method according to the present invention using a further arrangement of anode apparatus where an existing sacrificial anode is re-charged by a temporary plate electrode mounted on an exterior surface of the concrete ionically conductive material.

In FIG. 7 is shown a schematic illustration of the method using a further arrangement of where an existing sacrificial anode 40 is re-charged by a temporary surface applied electrode (impressed current anode) 41 on an exterior surface of the concrete 10 forming the ionically conductive material. In this case a conductor 42 connects the impressed current anode 41 to one terminal of the power supply 14 and a conductor 43 connects the buried sacrificial anode 40 to the other terminal of the DC power supply. At the same time the second terminal can be connected to the steel if the protection of the steel is intended to continue during the recharging process. Although the surface applied electrode is a preferred embodiment for recharging an existing sacrificial anode, other impressed current anodes such as embedded impressed current anodes may be used.

Figure 3:
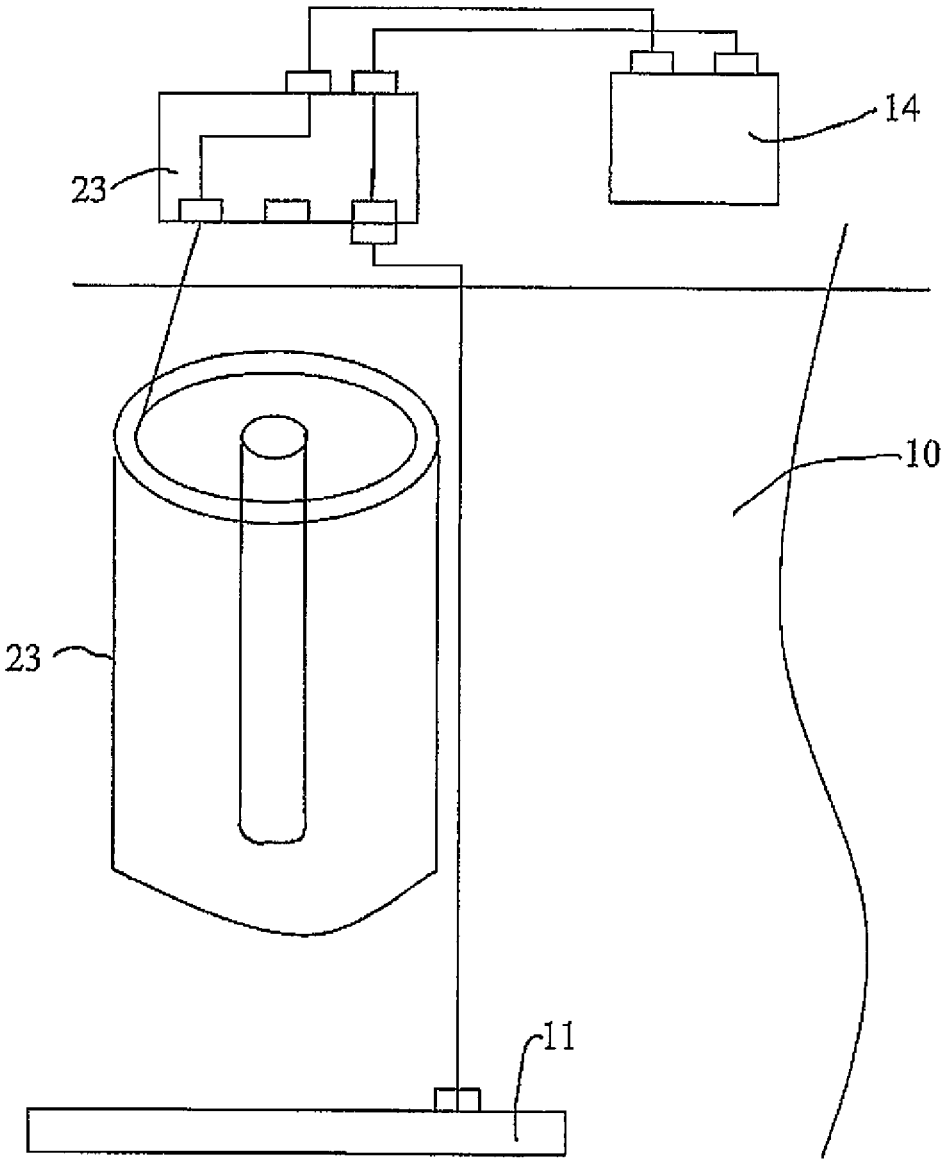
FIG. 3 is the schematic illustration of FIG. 1 showing the connection of the components for operation in the impressed current protection mode.
Figure 4:
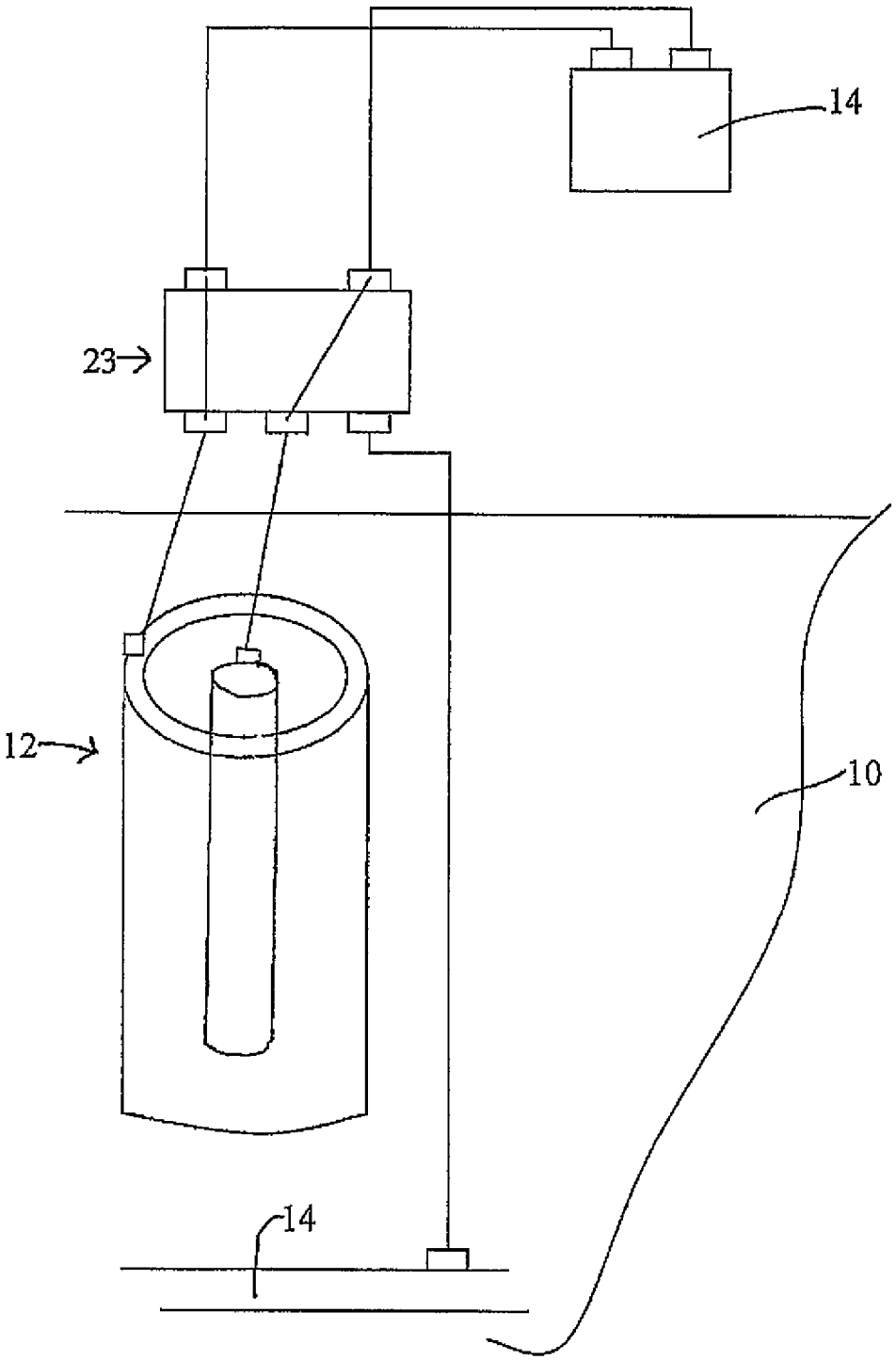
FIG. 4 is the schematic illustration of FIG. 1 showing the connection of the components for operation in the recharging mode.
Figure 5:
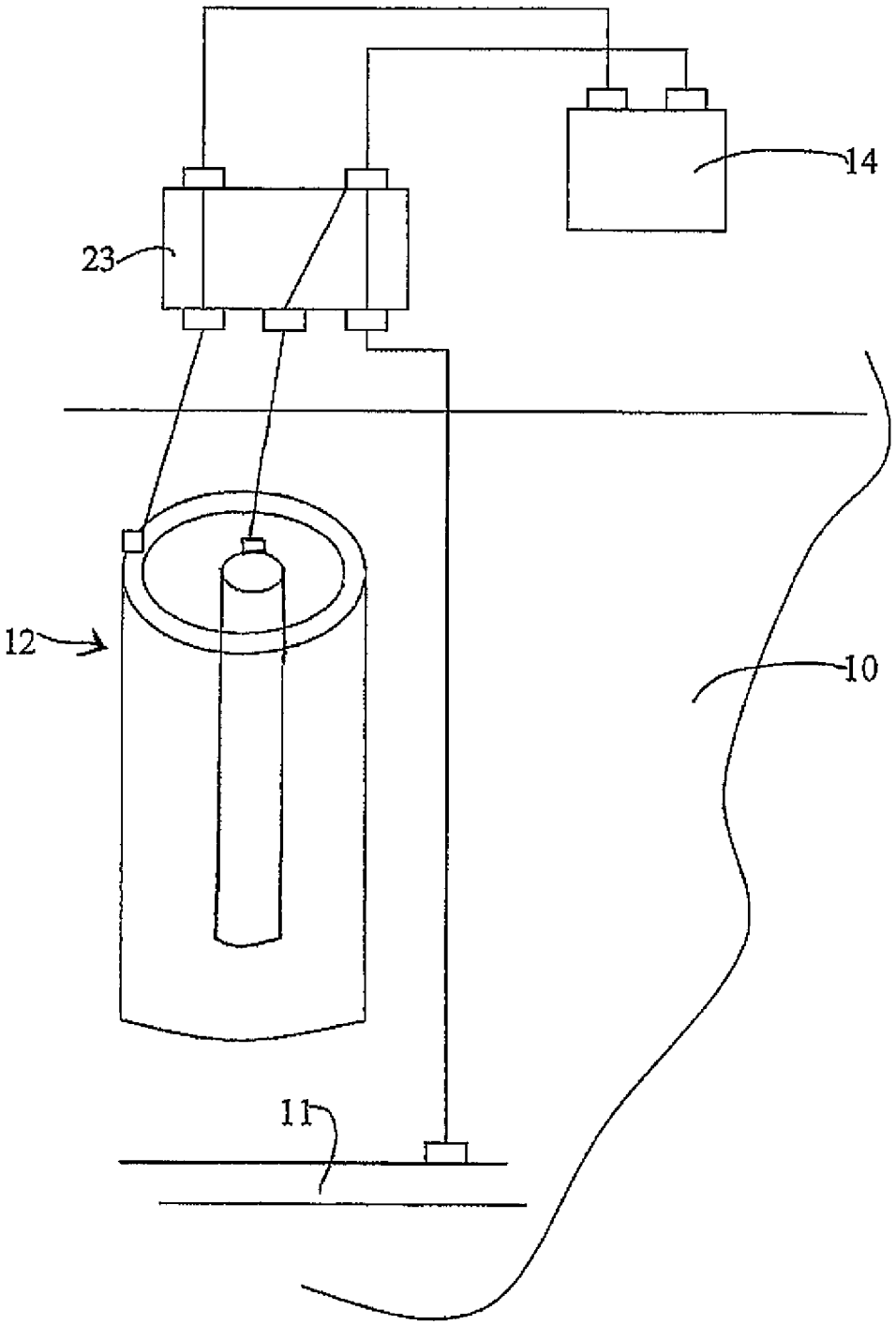
FIG. 5 is the schematic illustration of FIG. 1 showing the connection of the components for operation in the combined recharging and impressed current modes.

The four separate functions provided by the junction box can be performed simply as follows. These functions may also be performed manually by direct connection of the appropriate connectors without the need for a junction box.

a) Normal galvanic anode as shown in FIG. 2: the zinc core is connected to the steel via the junction box. The impressed current anode is set at the off position. This allows the anode to perform as a simple galvanic anode.

b) Impressed current anode as shown in FIG. 3: the zinc anode is set to the off position and the impressed current anode is connected to the steel via the DC power source. The current output can be regulated by controlling the applied voltage.

c) Recharging of galvanic anode as shown in FIG. 4: the impressed current anode is connected via the DC power source to the zinc anode. The steel is set to the off position. This allows the zinc ions or zinc corrosion products present in the electrolyte to be deposited onto the zinc core as zinc metal building up the thickness of the zinc anode. Zinc oxide, zincates and zinc hydroxide are three common corrosion products produced while the zinc anode is in operation.

d) Recharging of galvanic anode and impressed current as shown in FIG. 5: the impressed current anode is connected via the DC power source to both the zinc anode and the steel. This allows the re-charging process described at c) and the impressed current described at b) to proceed concurrently.

The first two functions are well understood and need no further description. However the arrangement, where both options are available (and operable) concurrently is novel.

The third function is novel with respect to the use of galvanic anodes for steel reinforcement protection and involves making the zinc anode cathodic allowing deposition of zinc. Zinc may be deposited from a number of zinc compounds and through various reactions and is likely to include Reactions 1, 2 and 3 if zinc is in an alkaline environment.

$$ZnO+2OH^-+H_2O \rightarrow Zn(OH)_4^{2-} \quad (1)$$

$$Zn(OH)_4^{2-} \rightarrow Zn^{2+}+4OH^- \quad (2)$$

$$Zn^{2+}+2e^- \rightarrow Zn \quad (3)$$

Theoretically, all the zinc oxide and other zinc ions and zinc corrosion products can be re-deposited on the core as usable zinc for subsequent consumption. In reality, as with rechargeable alkaline batteries, the level of each subsequent recharge is likely to be reduced.

A typical reaction at the impressed current electrode is likely to be:

$$2OH^- \rightarrow \tfrac{1}{2}O_2+H_2O+2e^- \quad (4) \text{ or}$$

$$H_2O \rightarrow \tfrac{1}{2}O_2+2H^++2e^- \quad (5)$$

There is therefore a net balance of the hydroxyl ions which means there is no overall loss in alkalinity within the assembly. There is a net increase in hydroxyl ions at the surface of the zinc anode which is beneficial in accommodating large amounts of the soluble zincate ions once the anode is used again, in galvanic mode, to protect the steel reinforcement. The reaction at the impressed current anode (Eq 4 or 5) involves the production of oxygen gas which needs to escape from the assembly and into the concrete pore structure. The impressed current anode, therefore, should be porous, be in the form of a net or be vented.

A preferred way to employ the anode arrangement herein is to initially set it up as a normal galvanic anode, allowing it to run for a period of say 10-20 years according to exposure conditions. Occasional monitoring will determine when recharging of the anode is required. An external power supply is then used to recharge the anode over a relatively short period, preferably no more than 14-60 days. The anode is then able to produce adequate current for a further period of time, say 5-20 years. The process can be repeated several times until recharging becomes essentially ineffective. If required, the impressed current part of the anode can then be simply used as part of an impressed current corrosion protection system. Protection of the steel reinforcement could therefore be achieved for the whole life of the structure.

The assembly has great flexibility which allows variable application types. For example, a preliminary use of the impressed current part of the anode can deliver an initial high level of charge over a limited period in order to passivate the steel to virtually stop any ongoing corrosion. Alternatively, the impressed current part of the anode can be operated to deliver a cumulative charge to increase the alkalinity of the concrete surrounding the steel and reduce future corrosion and current demand from the galvanic anode. Applied charge of 20,000 to 150,000 and more typically, 70,000 to 120,000 Coulombs per square meter of steel has been shown to be sufficient to passivate the steel. Applied charges of around 700,000 Coulombs/m2 have been effective at re-alkalizing (increasing the pH) of carbonated concrete. The charge required to increase the pH of concrete which is not carbonated will be less than 700,000 Coulombs/m2. This can then be followed by a lower level of galvanic current to maintain passivity of the steel. Using the impressed current anode to deliver the high initial charge is beneficial as this prevents unnecessary consumption and degradation of the sacrificial anode, allows a smaller sacrificial anode to be used and allows the sacrificial anode to provide higher current to the steel after the high initial charge has been passed to the steel by the impressed current anode. Recharging of the anodes can still be carried out if required. Furthermore, additional externally applied current can be delivered via the impressed current anode of the assembly if steel passivity is lost, if the current from the sacrificial anode is not sufficient to polarize the steel or if either the corrosion potential or the corrosion rate of the steel increases above desired levels.

The sacrificial anode may be connected to the steel while the impressed current anode is polarising the steel for the purpose of reactivating or increasing the activation of the sacrificial anode. This can be achieved by increasing the alkalinity at the anode surface which can dissolve zinc oxide corrosion products into soluble zincate ions, according to equation (1), and allow them to dissipate away from the anode surface and allowing better subsequent current flow and improved performance of the anode.

The current flowing to the sacrificial anode may be limited or controlled such that the sacrificial anode is reactivated without necessarily recharging the sacrificial anode.

The assembly also has the capability to operate principally as an impressed current anode with a rechargeable galvanic anode backup for periods when the impressed current anode is off line or is otherwise non-functional. Similarly, the impressed current anode can be available to operate as a backup to the sacrificial anode should the sacrificial anode become non-functional.

In a preferred arrangement, the inert anode may be capable of delivering a high level of current, possibly as high as 1 mA/cm2. The resistance of the electrolyte is preferably therefore as low as possible, so that a gel may be more suitable than a solid. Considerable levels of oxygen gas can be produced during charging which needs to disperse adequately through the anode walls and surrounding concrete.

In order for the anode to be rechargeable, the electrolyte is preferably highly alkaline. This allows high concentrations of $Zn(OH)_4^{2-}$ in solution after the dissolution of zinc which, with supersaturation, is believed to precipitate out as ZnO. These reactions are believed to be as set out in Equations 6 and 7 below, which are essentially the reverse of Reactions 1 and 2.

$$Zn+4OH^- \rightarrow Zn(OH)_4^{2-}+2e^- \quad (6)$$

$$Zn(OH)_4^{2-} \rightarrow ZnO+2OH^-+H_2O \quad (7)$$

Other electrolytes which are not highly alkaline are also suitable as long as soluble or electrochemically mobile zinc ions are present.

Preferably the assembly includes sufficient moisture to be highly ionically conductive and to allow sacrificial anode ions to be mobile during charging or recharging. Humectants, gels and other hydroscopic materials can be beneficial in this regard. In an alternative arrangement, charging or recharging of sacrificial anodes can be improved by applying water or another wetting solution to at least a portion of the structure and or specifically the sacrificial anode to keep it sufficiently conductive during the charging or recharging process.

Testing has shown that zinc can be deposited onto many substrates including; zinc, titanium, copper, brass, 70/30 brass, steel. stainless steel and alloys. As such, partially discharged and fully consumed sacrificial anodes can be regenerated.

Example 1

In one example, a cast zinc anode, 8 cm long with a minimum diameter of 0.7 cm, was located in ZnO/thixotropic paste packed inside a conductive ceramic impressed current anode tube. The zinc paste was made from a solution saturated with LiOH with 2M KOH and 20% ZnO along with carboxymethyl cellulose sodium gelling agent. The paste was packed in the space between the zinc anode and the inner side of the 28 mm tube. Testing has shown that ions can pass through the porous tube walls such that the zinc anode can pass current onto the external steel reinforcing bar even though it is located inside the impressed current anode. Subsequently, charging of the zinc can be accomplished by reversing the flow of ions through the impressed current porous tubular anode by applying an external voltage between the impressed current anode and the sacrificial anode. An applied voltage of around 6-8 Volts resulted in a current of up to 1.6 A to be delivered to the inner zinc anode achieving a total charge/recharge of just under 40,000 Coulombs. Surprisingly, the zinc anode performed better after recharging than it did originally. After charging of the zinc anode, when the zinc anode was reconnected to the steel, the current output and cumulative charge output of the recharged zinc anode through the porous tubular impressed current anode to the steel is increased compared to the original zinc anode. The reasons for this improvement in performance are not fully understood but may relate to an increased surface area of the zinc metal after deposition or to the relative increase of hydroxyl ions at the immediate vicinity of the zinc surface which encourages dissolution of zinc and zinc corrosion products such as zinc oxide and deposition of zinc from zinc corrosion products such as zincate ions (equations 1-3). It is evident, nonetheless, that the current output of the anode after charging is increased.

Figure 8:
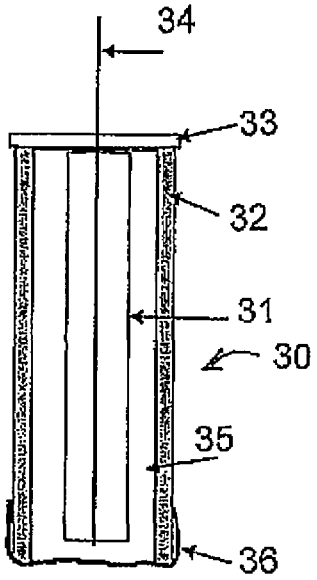
FIG. 8 is a cross-sectional view through a first example of an anode apparatus according to the invention.

In FIG. 8 shows an example of an anode apparatus 30 as previously described where the apparatus includes a Cast Zinc Core 31 inside a 28 mm diameter porous conductive impressed current anode 32. An upper end is closed by an attached disk 33 forming a porous form and a lower end is closed by a Porous Fabric Cap 36. Between the core 31 and the cylindrical anode 32 is provided a filler material of LiOH+2M KOH+20% ZnO+carboxymethyl cellulose sodium 35. The core is attached to a steel wire 34 for connection as described above.

Figure 9:
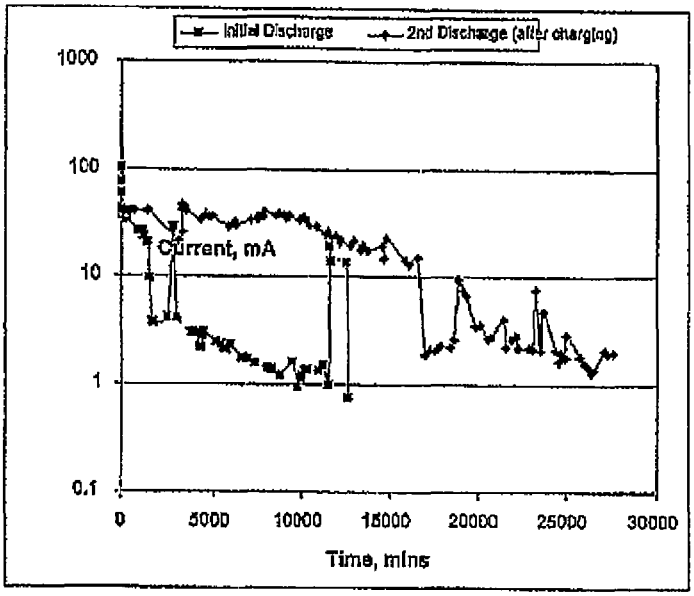
FIG. 9 is a graph of current output of the anode of FIG. 8 to steel, a) with the anode as originally made, b) with the anode after a period of charging via the porous conductive impressed current anode.

FIG. 9 is a graph of current output of the anode of FIG. 8 to steel, a) with the anode as originally made, b) with the anode after a period of charging via the porous conductive impressed current anode.

Figure 10:
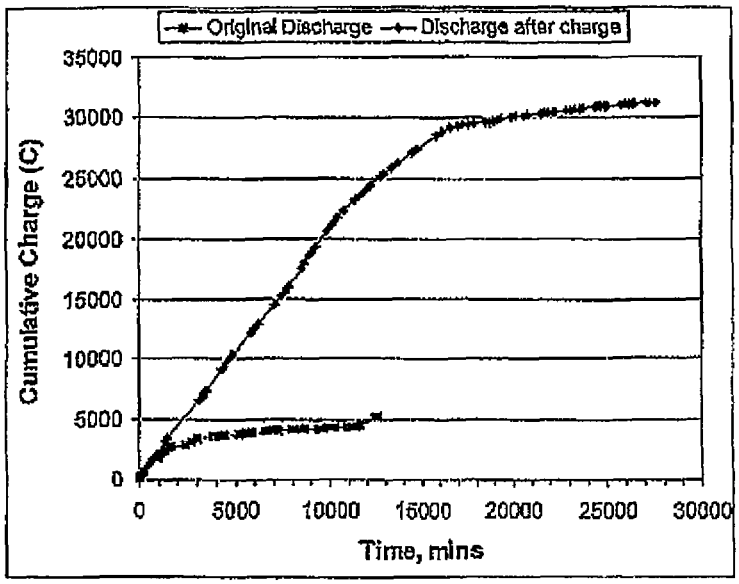
FIG. 10 is a graph of cumulative charge output of the anode of FIG. 8 to steel, a) with anode as originally made, b) after a period of charging via the porous conductive tube.

FIG. 10 is a graph of cumulative charge output of the anode to steel, a) with anode as originally made, b) after a period of charging via the porous conductive tube.

Example 2

An assembly 49 to demonstrate the ability to charge/recharge an anode in situ was constructed as shown in FIG. 11. It consisted of a zinc wire 50 partly immersed in a highly alkaline (7 molar OH—) gel 51. A copper wire connector 53 for the sacrificial anode to be formed in situ was also immersed in the same gel. The gel was contained within a perforated plastic tube 54 lined both internally and externally by a layer of fibre fabric 55 and ionically conductive membrane acting as a separator of the anode and cathode 56. Between the external fabric and the tube a mixed metal oxide (MMO) coated titanium mesh 57 was fixed circumferentially and had a titanium connection wire 58 attached to one side. The whole assembly was encased in a mortar 59 enriched with LiOH.

The anode assembly 49 was cast centrally in a cement mortar prism approximately 80 mm×50 mm×40 mm high ensuring that the whole assembly was encased within the cement mortar 59. As shown in FIG. 12, the prism was then placed in a larger container 61 filled almost to the height of the prism with an alkaline solution 60. An external mesh 62 of MMO coated titanium was placed along the periphery of the container to act as the metal section.

The zinc wire 50 was connected electrically to the external titanium mesh 62. The assembly 49 was then seen to act as a galvanic anode passing current to the external titanium mesh (metal section) and producing zinc corrosion products until all available zinc was consumed.

An external power supply (not shown) was then connected to the internal MMO coated titanium mesh anode 57 within the anode assembly 49 and the copper wire 53 ensuring that the copper was cathodic. Zinc corrosion products from the consumed (corroded) zinc wire 50 were deposited on the copper wire 53 to form a sacrificial anode during this charging process. Subsequent connection of the copper wire 53, now carrying the deposited zinc and the external MMO coated titanium mesh (metal section) allowed current to pass between the charged anode 53 and the metal section 62. The current produced by the charged anode (copper wire with deposited zinc) was comparable to the current produced by the original zinc wire. Comparison of current produced by the original 'discharge' of the zinc wire and the zinc which was deposited on the copper wire is shown in Table 1.

TABLE 1

Current output of original zinc wire and deposited zinc on copper wire

| | Current output (mA) | | |
|---|---|---|---|
| | Maximum | Minimum | Mean |
| Original zinc wire | 5.47 | 0.05 | 0.70 |
| Deposited zinc on Copper Wire | 5.20 | 0.05 | 0.51 |

Turning now to FIGS. 13 and 14, a sacrificial anode 100 and an impressed current anode 101 are provided in the ionically conductive covering material 102 where a DC power supply 107 is connected across the sacrificial anode and impressed current anode. This provides a recharging phase which can be carried out during cathodic protection where the sacrificial anode is connected to the steel 108 or as a separate step.

Movement of moisture towards the sacrificial anode 100 from the impressed current anode 101 is obtained during the recharge phase. This is believed to be by the process of electro-osmosis. A simple experiment, as depicted in FIG. 13, demonstrated measurable water movement from the negatively charged electrode 101 to the positively charged electrode 100 embedded in the high alkalinity mortar 102, the latter 100 representing the sacrificial anode material during recharge. Item 103 represents a perforated plastic tube at the anode 101. Added water 104 was detected at the second plastic tube 105.

Table 2 below and FIG. 14 summarise the increase in volume of water observed with time of the recharged anode at a current of 1.5 mA. This application of current thus results in water movement which can replenish the electrolyte around the anode and facilitate better deposition of zinc metal during recharge.

TABLE 2

Moisture movement with time at an applied current of 1.5 mA between two electrodes embedded in a highly alkaline mortar.

| | Current output (1.5 mA) | | |
|---|---|---|---|
| Time (days) | Required Drive Voltage to maintain current (V) | Difference in height of water level in two compartments (mm) | Volume of water which migrates during application of recharge current (ml) |
| 0 | 1.94 | 0 | 0 |
| 1 | 2.23 | 0.5 | 0.03 |
| 6 | 2.19 | 3 | 0.19 |
| 22 | 2.04 | 7 | 0.44 |
| 28 | 1.98 | 7.5 | 0.47 |

Also shown in FIG. 13 is a separator 106 in the form of a microporous ionically conductive membrane, which is used primarily to limit or avoid dendritic growth of the sacrificial material (zinc metal) during recharge, to restrict zinc deposition to within the contained volume encased by the separator while allowing moisture movement and ionic conductivity through its pores. It is desirable that the pore size and pore distribution of the separator are such that it optimises movement of moisture. It is preferable that it restricts movement of moisture out of the anode-encasing electrolyte into the bulk surrounding electrolyte but allows the beneficial electro-osmotic movement of moisture back into the anode-encasing electrolyte during charging.

As explained previously, the potential difference across the anodes 100, 101 causes ions of the sacrificial anode material to move to the sacrificial anode 100.

Additives 109 are provided in the structure at or adjacent the anode 100 which acts to limit gassing from the sacrificial anode. The additives can be a surfactant, a form of cellulose or can comprise alloying zinc metal with suitable elements such as nickel or indium which is arranged to reduce the hydrogen over-potential significantly and hence limit hydrogen gassing.

The membrane 106 acts for restricting dendritic growth of sacrificial anode material on the sacrificial anode. The membrane separator 106 is located around or adjacent to the sacrificial anode and acts to contain sacrificial material at the sacrificial anode, to avoid dendritic growth of sacrificial anode material on the sacrificial anode beyond the membrane and to allow moisture movement to the sacrificial anode.

In order to provide ions for communication to the anode 100, particles or powder 110 of sacrificial anode material or sacrificial anode corrosion products are provided alone or intermixed with an ionically conductive filler material 111 at or adjacent the sacrificial anode.

As explained previously the potential difference caused by the DC power supply 107 causes an increase in the galvanic current generated by the sacrificial anode subsequent to application of the potential difference relative to that before the application. Also this action acts to increase alkalinity at the surface of the sacrificial anode where the increased alkalinity acts to dissolve zinc oxide corrosion products into soluble zincate ions and allow them to dissipate away from the surface.

The DC power supply is in some cases arranged so as to limit current flowing to the sacrificial anode by the potential difference such that the sacrificial anode is reactivated without recharging the sacrificial anode with additional ions of the sacrificial material.

The application of the DC power supply causes water movement from the negatively charged impressed current anode to the positively charged sacrificial anode. This also can cause an increase in a total surface area of the sacrificial anode material at the sacrificial anode. This can also result in increased quantity of hydroxyl ions at the immediate vicinity of the sacrificial anode.

The invention claimed is:

1. A method for corrosion protection of a metal section in a cast body of an ionically conductive concrete or mortar material comprising:

providing an anode assembly comprising:

an impressed current anode; and a sacrificial anode of a material which is less noble than the metal section;

maintaining the impressed current anode electrically separated from the sacrificial anode to prevent direct electrical communication therebetween;

prior to installation, positioning the impressed current anode and the sacrificial anode into [an] *a common* assembly, wherein the impressed current anode and the sacrificial anode are fixed at relative positions in the *common* assembly;

installing the *common* assembly, while the impressed current anode and said sacrificial anode are at said fixed positions, in contact with the cast body of ionically conductive concrete or mortar material so as to locate the impressed current anode in ionic contact with the cast body of ionically conductive concrete or mortar material and so as to locate the sacrificial anode in ionic contact with the cast body of ionically conductive concrete or mortar material;

providing a DC power supply having a first pole and a second pole; the *common* assembly including *a first* electrical connecting [components] *component* connected to the impressed current anode and *a second electrical component connected to* the sacrificial anode; and providing corrosion protection to the metal section by:

providing a connection by the *first* electrical connecting [components] *component* of the first pole of the DC power supply to the impressed current anode;

providing a connection of the second pole of the DC power supply to the metal section; and providing a connection *by the second electrical component* of the sacrificial anode to the metal section;

so that the impressed current anode by *a* current from the DC power supply provides the corrosion protection of the metal section;

and when the DC power supply *or impressed current anode* is not [present] *functional* a current between the metal section and the sacrificial anode provides the corrosion protection of the metal section.

2. The method according to claim 1 wherein a voltage difference between the sacrificial anode and the impressed current anode caused by the DC power supply causes ions of the sacrificial anode material to move to the sacrificial anode so as to regenerate the sacrificial anode.

3. The method according to claim 2 including providing an additive which acts to limiting gassing from the sacrificial anode.

4. The method according to claim 3 wherein the additive is a surfactant.

5. The method according to claim 3 wherein the additive comprises cellulose.

6. The method according to claim 2 including restricting dendritic growth of sacrificial anode material on the sacrificial anode.

7. The method according to claim 2 including causing moisture movement towards the sacrificial anode.

8. The method according to claim 2 wherein there is an ionically conductive membrane separator between the sacrificial anode and the impressed current anode.

9. The method according to claim 8 wherein the ionically conductive membrane separator is located around or adjacent to the sacrificial anode.

10. The method according to claim 8 wherein the ionically conductive membrane separator acts to contain sacrificial material at the sacrificial anode, to avoid dendritic growth of sacrificial anode material on the sacrificial anode beyond the membrane and to allow moisture movement to the sacrificial anode.

11. The method according to claim 1 wherein the sacrificial anode material comprises particles or powder.

12. The method according to claim 1 wherein the sacrificial anode is connected to the metal section while the DC power supply is connected to the impressed current anode.

13. The method according to claim 1 wherein the sacrificial anode is connected to the metal section and the DC power supply is connected to the impressed current anode when the common assembly is installed.

14. The method according to claim 2 including increasing alkalinity at the surface of the sacrificial anode.

15. The method according to claim 14 wherein the sacrificial anode comprises zinc and wherein the increased alkalinity acts to dissolve zinc corrosion products from corrosion of the sacrificial anode into soluble zincate ions.

16. The method according to claim 1 wherein a [current flowing to the sacrificial anode in response to a] voltage difference between the sacrificial anode and the impressed current anode caused by the DC power supply *acts to generate a current flowing to the sacrificial anode and wherein the flowing current* is limited *to a value* such that the sacrificial anode is reactivated without [recharging the sacrificial anode with] *transferring* additional ions [of] *to* the sacrificial material.

17. The method according to claim 2 including increasing a total surface area of the sacrificial anode material at the sacrificial anode.

18. The method according to claim 1 including increasing a quantity of hydroxyl ions at the immediate vicinity of the sacrificial anode.

19. The method according to claim 1 wherein the sacrificial anode is formed of solid anode material.

20. The method according to claim 1 wherein the sacrificial anode is formed of powdered or finely divided sacrificial anode material.

21. The method according to claim 1 wherein the sacrificial anode comprises zinc oxide.

*22. The method according to claim 1 wherein the DC power supply discharges as the current is supplied and additional electrical power is supplied when discharging has occurred.*

*23. The method according to claim 22 wherein the additional electrical power is supplied by recharging the DC power supply.*

*24. The method according to claim 22 wherein the additional electrical power is supplied by replacing the DC power supply.*

*25. The method according to claim 22 wherein the sacrificial anode is connected to the metal section while the DC power supply is connected to the impressed current anode.*

*26. The method according to claim 22 wherein the sacrificial anode is connected to the metal section and the DC power supply is connected to the impressed current anode when the common assembly is installed.*

* * * * *